US007155460B2

United States Patent
McGovern et al.

(10) Patent No.: US 7,155,460 B2
(45) Date of Patent: Dec. 26, 2006

(54) WRITE-ONCE-READ-MANY STORAGE SYSTEM AND METHOD FOR IMPLEMENTING THE SAME

(75) Inventors: William P. McGovern, San Jose, CA (US); Jeffrey L. Heller, Menlo Park, CA (US); J. Christopher Wagner, Langley, WA (US)

(73) Assignee: Network Appliance, Inc., Sunnyvale, CA (US)

( * ) Notice: Subject to any disclaimer, the term of this patent is extended or adjusted under 35 U.S.C. 154(b) by 261 days.

(21) Appl. No.: 10/391,245

(22) Filed: Mar. 18, 2003

(65) Prior Publication Data

US 2004/0186858 A1    Sep. 23, 2004

(51) Int. Cl.
*G06F 17/30* (2006.01)
(52) U.S. Cl. .................. 707/200; 707/205; 707/201; 707/202; 707/203
(58) Field of Classification Search ................ 707/205, 707/206, 101, 200–203; 709/200; 711/165, 711/163, 102
See application file for complete search history.

(56) References Cited

U.S. PATENT DOCUMENTS

| | | |
|---|---|---|
| 5,163,131 A | 11/1992 | Row et al. |
| 5,355,453 A | 10/1994 | Row et al. |
| 5,485,579 A | 1/1996 | Hitz et al. |
| 5,802,366 A | 9/1998 | Row et al. |
| 5,819,292 A | 10/1998 | Hitz et al. |
| 5,931,918 A | 8/1999 | Row et al. |
| 5,941,972 A | 8/1999 | Hoese et al. |
| 5,963,962 A | 10/1999 | Hitz et al. |
| 6,038,570 A | 3/2000 | Hitz et al. |
| 6,065,037 A | 5/2000 | Hitz et al. |
| 6,085,298 A * | 7/2000 | Ohran ........................ 711/162 |
| 6,108,285 A * | 8/2000 | Freeman et al. ............ 707/200 |
| 6,298,386 B1 * | 10/2001 | Vahalia et al. .............. 709/234 |
| 6,330,571 B1 * | 12/2001 | Bills et al. ................... 707/205 |
| 6,425,035 B1 | 7/2002 | Hoese et al. |
| 6,457,130 B1 * | 9/2002 | Hitz et al. ................... 713/201 |
| 6,606,693 B1 | 8/2003 | Morris |
| 6,823,336 B1 * | 11/2004 | Srinivasan et al. ............ 707/8 |

OTHER PUBLICATIONS

U.S. Appl. No. 09/127,497, filed Nov. 22, 2001, Kleiman et al.

(Continued)

*Primary Examiner*—Cam-Y Truong
(74) *Attorney, Agent, or Firm*—Cesari and McKenna, LLP

(57) ABSTRACT

A write-once-read-many (WORM) storage system that employs large-capacity and relatively inexpensive disks in connection with a file system on a file server is provided. The file system contains most or all of the required WORM functionality so as to impose a minimal footprint on client applications, client operating systems and open protocols if desired. The system is organized around WORM storage volumes that contain files that, when committed to WORM storage, cannot be deleted or modified. Any file path or directory tree structure used to identify the file within the WORM volume is locked and cannot be deleted. In one embodiment, the administrator creates a WORM volume, capable of storing designated WORM files. The client then creates an appropriate WORM file using the appropriate protocol semantics. The file is written to the volume and committed by transitioning the file attributes from a not-read-only to a read-only state. The file system recognizes the persistently stored WORM attribute of any file in a WORM volume as WORM file. Henceforth, any attempt to modify the file attributes, write to the file, or delete the file, by clients, administrators or other entities is rejected and a request denied message is returned to the attempting party

15 Claims, 6 Drawing Sheets

OTHER PUBLICATIONS

U.S. Appl. No. 09/932,578, filed Jun. 27, 2002, Lewis et al.
U.S. Appl. No. 10/100,967, Federwisch et al.
David Hitz et al. TR3002 File System Design for a NFS File Server Appliance published by Network Appliance, Inc.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
Fielding et al. (1999) Request for Comments (RFC) 2616, HTTP/1.1.
Notification of Transmittal of the International Search Report or the Declaration PCT/US04/06836 Mar. 5, 2004.

* cited by examiner

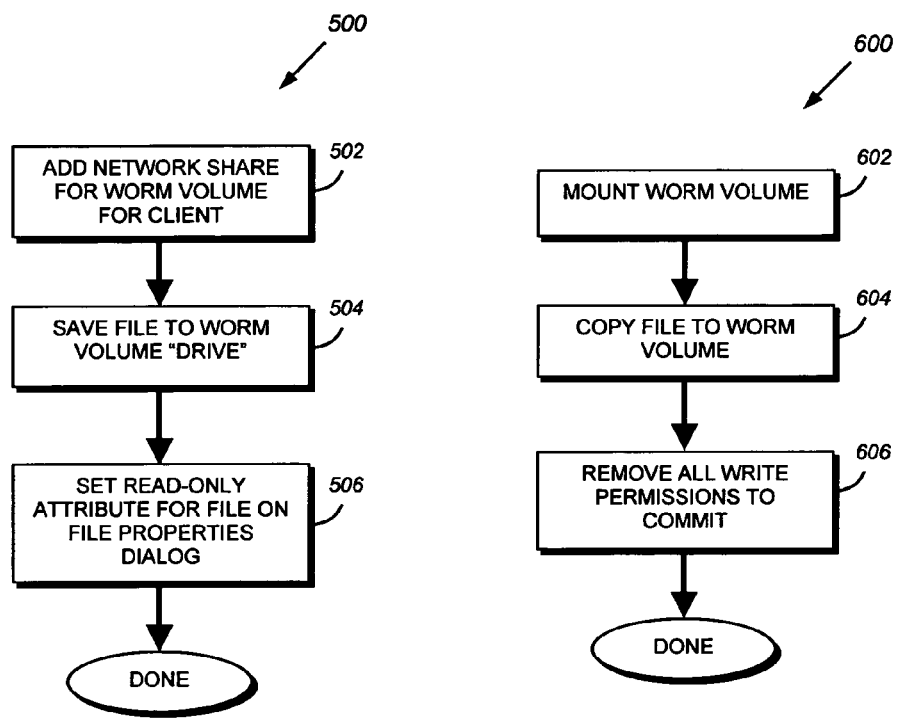

WRITE-ONCE-READ-MANY STORAGE SYSTEM AND METHOD FOR IMPLEMENTING THE SAME

FIELD OF THE INVENTION

This invention relates to data storage systems having write-once-read-many capabilities for enhanced data integrity.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a direct connection or computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. By "file system" it is meant generally a structuring of data and metadata on a storage device, such as disks, which permits reading/writing of data on those disks. In a write in-place file system, the locations of the data structures, such as modes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not over-write data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ software, residing on the filer, that processes file-service requests from network-attached clients.

As used herein, the term "storage operating system" generally refers to the computer-executable code operable on a computer that manages data access and may, in the case of a filer, implement file system semantics, such as the Data ONTAP™ storage operating system, implemented as a microkernel, and available from Network Appliance, Inc. of Sunnyvale, Calif., which implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof; volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

Data storage is an increasingly crucial and central part of many industries dealing in financial transactions and other sensitive tasks, such as banks, government facilities/contractors, defense, health care institutions, pharmaceutical companies and securities brokerages. In many of these environments, it is necessary to store selected data in an immutable and unalterable manner. This need continues to grow in the light of current concerns over institutional fraud and mismanagement, wherein the temptation on the part of wrongdoers to erase or alter incriminating data is always present. Forms of data that require immutable treatment often include e-mails, financial documents and transaction records, and any other record that may act as proof of an important action or decision. Even in less-critical/unregulated environments, the ability to store a secure unalterable data cache is highly desirable. For example engineering, medical, law and other professional firms may wish to establish a cache of key data (e.g. invention reports or design files, client communications, medical images, etc.), that will remain unaltered and online for long periods on time. These caches can provide reliable references and proofs for clients and other interested parties.

For an example of a highly regulated environment, the United States Securities and Exchange Commission (SEC)—the body that regulates all securities transactions and reporting relative to public corporations—promulgates SEC Rule 17a-4 governing document retention for brokers and investment institutions. This rule requires that these entities store e-mails and other documents in connection with a variety of transactions and trades by clients of the entities unchanged and unchangeable for a number of years and to be able to provide these records to the SEC and other regulators on short notice. Failure to comply with these rules can lead to significant sanctions.

The simplest approach to providing an immutable record of selected data is to print out the subject data into hardcopy form and then to store it physically as paper records or microfiche copies according to an established procedure. The drawbacks to this approach are many. The printouts and/or transfer to microfiche must occur regularly and continuously, resulting in a potentially huge investment of worker-hours. Large spaces for physical storage are required. In many instances, the amount of incoming data could simply overwhelm a physical storage system's ability to handle it. Retrieval of such data is inherently slow and human error resulting in the misfiling/non-filing of at least some data is likely. Thus, this approach is unsuited to the ever-growing volume of data requiring immutable storage. A significantly better approach involves the use of non-physical storage media (e.g. optical, tape or disk-based storage).

A common approach to creating a cache of immutable data in a computer-based storage system is to establish a bank of write-once-read-many (also termed "WORM") storage devices in communication with one or more file servers that handle the data. Basic WORM devices consist of removable tape drives that back up and store the contents of a file server memory/disks at predetermined times. Inherent in the tape drive's functionality is the ability to create a WORM copy of certain stored data. When an administrator directs the production of a WORM tape copy, the drive then records one or more indexed tags on the segment of the tape containing the WORM data. This tag is hence-forth recognized by the drive as a WORM copy and, in response to the tag, the drive prohibits the overwrite of that segment. This approach is effective but still fraught with disadvantages. Tapes have relatively limited storage and must be physically removed and stored when full. This requires human intervention that can lead to loss or misfiling of the tapes and that slows retrieval of the information as the physical tapes must be found, mounted and replayed. In addition, the WORM capability is largely dependent of the drive's recognition of the tags and ability to prevent overwrite. Drives may become broken or obsolete over time and the associated WORM tags may be meaningless to newer drives.

More recent WORM systems use electro-optical drives and an internal stack of optical storage platters (similar to recordable compact disks). These drives are highly effective in creating WORM copies as the platters are chemically etched by a drive laser to generate data patterns, and they can only be etched once in a given storage location. The disadvantage to optical storage is that these drives are expensive in comparison to conventional disks and tapes, and more importantly, still retain significant physical limitations in maximum storage size. In other words, while these drives may be able to easily handle several hundred gigabytes of data, the trend is toward the storage of terabytes of data. As such new drives and platters must be added to the system continuously at a significant cost of materials and labor. Similarly, like tape and other non-disk media, write time may be somewhat slow when compared to conventional disk storage.

An inherently desirable approach to WORM storage would be to employ conventional fault-tolerant (e.g. RAID-based) disk storage (or similar rewritable media) as a platform for a WORM storage system. Such disks are relatively inexpensive and easily added to an existing storage system. However, disks are inherently rewritable and/or erasable, and existing operating systems and protocols are designed with semantics that specifically enable the free rewriting and erasure of attached disks. Any solution that utilizes disks to implement WORM storage must absolutely prevent alteration of WORM-designated data. In addition, to maintain longevity of the solution and make it available to as many clients as possible, the WORM implementation should utilize open protocols such as CIFS and NFS and require minimal alteration to these protocols or the applications that employ them.

SUMMARY OF THE INVENTION

This invention overcomes the disadvantages of the prior art by providing a write-once-read-many (WORM) storage system that employs large-capacity and relatively inexpensive disks in connection with a file system on a file server that contains most or all of the required WORM functionality so as to impose a minimal footprint on client applications, client operating systems and open protocols if desired. The system is organized around WORM storage volumes that contain files that, when committed to WORM storage, cannot be deleted or modified. Any file path or directory tree structure used to identify the file within the WORM volume is locked and cannot be deleted.

In an illustrative embodiment, the administrator creates a WORM volume, capable of storing designated WORM files. The client then creates an appropriate WORM file using the appropriate protocol semantics. The file is written to the volume and committed to WORM state by transitioning the file attributes from a not-read-only state to a read-only state. The file system persistently stores the WORM state of a file with the attributes and metadata for the file and uses this persistent WORM state to recognize WORM files on a WORM volume. Henceforth, any attempt to modify the file attributes, write to the file, or delete the file, by clients, administrators or other entities is rejected and a request denied message is returned to the attempting party. Since the file cannot be deleted, conventional file system semantics prevent deletion of the directory path. Likewise, the file system does not permit renaming of directories in an illustrative embodiment to thereby ensure the reliable and immutable identification of WORM files within the directory structure.

In one embodiment, committing of the WORM file to the WORM storage volume can be performed by the client via a command line interface in an interactive manner. Alternatively, applications, which are familiar with the WORM semantics, can be adapted to commit the file using an appropriate application program interface or other programmatic command structure. Similarly, open protocols, such as NFS or CIFS, through which the clients communicate with the file server/file system can be modified to enable automatic commit of created files upon a key event, such as closing of the file.

In another embodiment, the protocols and file system can be adapted to enable specialized WORM directories within the volume. An appropriate WORM file extension can be provided so that worm files within the volume can be readily identified by the client. Also, selected mirroring and backup functions may be allowed, while other backup functions that enable restoration or reversion of the volume to an earlier point in time may be disabled.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 5 is a flow diagram of a WORM file creation and commit procedure for a Windows® client according to an illustrative embodiment of the present invention;

FIG. 6 is a flow diagram of a WORM file creation and commit procedure for a Unix® client according to an illustrative embodiment of the present invention;

DETAILED DESCRIPTION OF AN ILLUSTRATIVE EMBODIMENT

A. Network and File Server Environment

Figure 1:
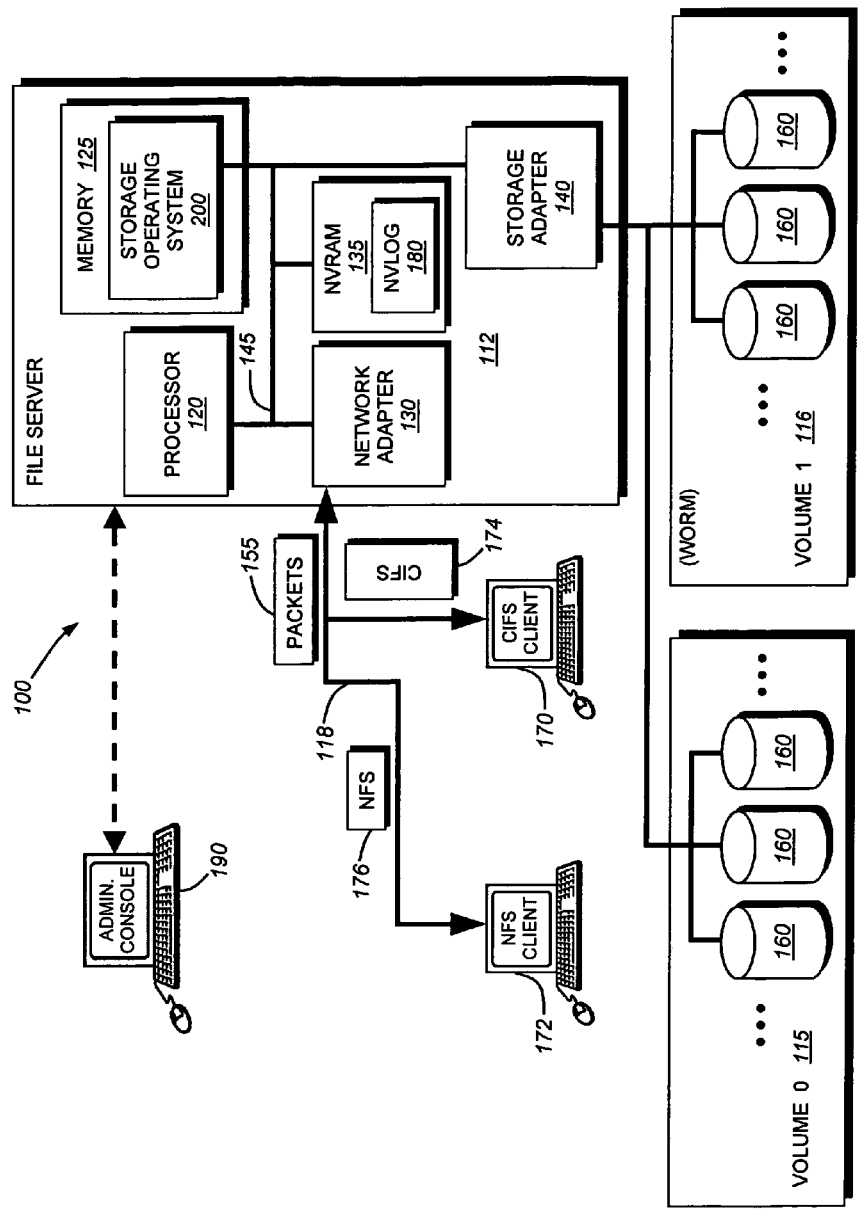
FIG. 1 is a schematic block diagram defining an exemplary network and file server environment including a file server and associated clients within which the principles of this invention are implemented.

By way of further background, FIG. 1 is a schematic block diagram of a storage system environment 100 that includes a file server 112 that may be advantageously used with the present invention. For the purposes of this description, the source system is a networked computer that manages storage of one or more storage disks 160 (can't find 162 in FIG. 1).

The file server or "filer" 112 manages one or more volumes 115 and 116, comprising arrays of disks 160. The filer 112 is linked to a network 118 that can comprise a local or wide area network, such as the well-known Internet. An appropriate network adapter 130 facilitates communication over the network 118. The filer 112 generally comprises a processor 120, a memory 125, a network adapter 130 and a storage adapter 140 interconnected by a system bus 145. Filer 112 also includes a storage operating system 200 (FIG. 2) that implements a file system to logically organize the information as a hierarchical structure of directories and files on the disks.

It will be understood to those skilled in the art that the inventive technique described herein may apply to any type of special-purpose computer (e.g., file serving appliance) or general-purpose computer, including a standalone computer, embodied as a storage system. To that end, the filer 112 can be broadly, and alternatively, referred to as a storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory 125 comprises storage locations that are addressable by the processor and adapters for storing software program code. The memory comprises a form of random access memory (RAM) that is generally cleared by a power cycle or other reboot operation (i.e., it is "volatile" memory). The processor and adapters may, in turn, comprise processing elements and/or logic circuitry configured to execute the software code and manipulate the data structures. The storage operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 130 comprises the mechanical, electrical and signaling circuitry needed to connect the filer 112 to the network 118, which may comprise a point-to-point connection or a shared medium, such as a local area network. A client (170, 172) may interact with the destination filer 112 in accordance with a client/server model of information delivery. That is, the client may request the services of the filer, and the filer may return the results of the services requested by clients 170 and 172 by exchanging packets 155 encapsulating, e.g., the TCP/IP protocol or another network protocol (CIFS 174 and NFS 176, respectively) format over the network 118.

The storage adapter 140 cooperates with the operating system 200 (FIG. 2) executing on the filer 112 to access information requested by the client. The information may be stored on the disks 160 that are attached, via the storage adapter 140 to the filer 112 or other node of a storage system as defined herein. The storage adapter 140 includes input/output (I/O) interface circuitry that couples to the disks over an I/O interconnect arrangement, such as a conventional high-performance, Fibre Channel serial link topology. The information is retrieved by the storage adapter and processed by the processor 120 as part of the snapshot procedure, to be described below, prior to being forwarded over the system bus 145 to the network adapter 130, where the information is formatted into packets and transmitted to the destination server as also described in detail below.

The filer may also be interconnected with one or more clients 170 via the network adapter 130. The clients transmit requests for file service to the filer 112 respectively, and receive responses to the requests over a LAN or other network (118). Data is transferred between the client 170, 172 and the filer 112 using respective data packets defined as an encapsulation of the Common Internet File System (CIFS) protocol (174) or another appropriate protocol, such as NFS (176).

In one exemplary filer implementation, the filer 112 can include a nonvolatile random access memory (NVRAM) 135 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

An administrator's console 190 is also provided in an illustrative embodiment for controlling various file server functions and operations. The console 190 can be a client or terminal connected via a dedicated port to the file server, or it can be networked via the network link 118, and reside at a remote location—potentially a long-distance away from the file server. Certain commands, to be described below, are entered through the console in an illustrative embodiment.

In an illustrative embodiment, the disks 160 are arranged into a plurality of volumes, by way of example termed Volume 0 (115) and Volume 1 (116), in which each volume has a file system associated therewith. The volumes 115, 116 each include one or more disks 160. In one embodiment, the physical disks 160 are configured into RAID groups. In one embodiment this organization is arranged so that some disks store striped data and some disks store separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume. As will be described below, Volume 0 (115) is a regular storage volume with full read and write access while Volume 1 (116) is a write-once-read-many (WORM) volume in which selected files cannot be modified, erased or otherwise deleted once they are committed to storage.

B. Storage Operating System

To facilitate generalized access to the disks 160, the storage operating system 200 (FIG. 2) implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which references to other files and directories are stored. As noted and defined above, in the illustrative embodiment described herein, the storage operating system is the NetApp® Data ONTAP™ operating system available from Network Appliance, Inc., of Sunnyvale, Calif. that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Figure 2:
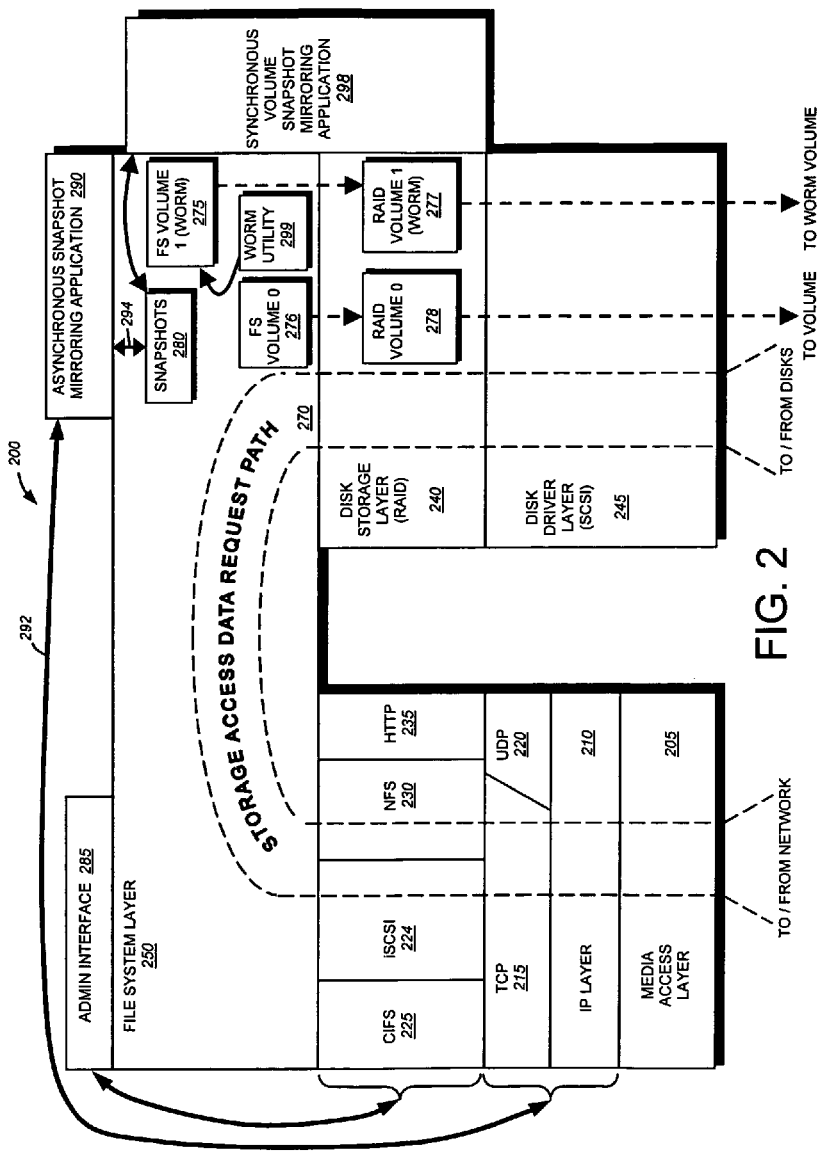
FIG. 2 is a schematic block diagram of an exemplary storage operating system in accordance with an illustrative embodiment of the present invention.

The organization of the preferred storage operating system for each of the exemplary filers is now described briefly. However, it is expressly contemplated that the principles of this invention can be implemented using a variety of alternate storage operating system architectures. As shown in FIG. 2, the exemplary storage operating system 200 comprises a series of software layers, including a media access layer 205 of network drivers (e.g., an Ethernet driver). The operating system further includes network protocol layers, such as the Internet Protocol (IP) layer 210 and its supporting transport mechanisms, the Transport Control Protocol (TCP) layer 215 and the User Datagram Protocol (UDP) layer 220. A file system protocol layer provides multi-protocol data access and, to that end, includes support for the CIFS protocol 225, the iSCSI protocol 224, the NFS protocol 230, the Hypertext Transfer Protocol (HTTP) protocol 235 and other protocols (not shown) that may be open or proprietary in format, such as NFS version 4, etc. In addition, the storage operating system 200 includes a disk storage layer 240 that implements a disk storage protocol, such as a RAID protocol, and a disk driver layer 245, that implements a disk control protocol such as the small computer system interface (SCSI).

Bridging the disk software layers with the network and file system protocol layers is a file system layer 250 of the storage operating system 200. Generally, the file system layer 250 implements a file system having an on-disk format representation that is block-based using, e.g., 4-kilobyte (KB) data blocks and using inodes or another data structure to describe the files. Note that while files are implemented in an illustrative embodiment, the term "file" or "files" should be taken broadly to include any type of data organization or "data container" including those used by block-level protocols such as SCSI. The term "data container" will therefore be used interchangeably herein.

In response to transaction requests, the file system generates operations to load (retrieve) the requested data from volumes if it is not resident "in-core", i.e., in the filer's memory 225. If the information is not in memory, the file system layer 250 indexes into the inode file using the inode number to access an appropriate entry and retrieve a volume block number. The file system layer 250 then passes the volume block number to the disk storage (RAID) layer 240, which maps that volume block number to a disk block number and sends the latter to an appropriate driver (for example, an encapsulation of SCSI implemented on a fibre channel disk interconnection) of the disk driver layer 245. The disk driver accesses the disk block number from volumes and loads the requested data in memory 125 for processing by the filer 112 (see FIG. 1). Upon completion of the request, the filer (and storage operating system) returns a reply, e.g., a conventional acknowledgement packet defined by the CIFS specification, to the client 170 over the respective network connection 172.

It should be noted that the software "path" 270 through the storage operating system layers described above needed to perform data storage access for the client request received at the filer may alternatively be implemented in hardware or a combination of hardware and software. That is, in an alternate embodiment of the invention, the storage access request data path 270 may be implemented as logic circuitry embodied within a field programmable gate array (FPGA) or an application specific integrated circuit (ASIC). This type of hardware implementation increases the performance of the file service provided by the filer 112 in response to a file system request packet issued by the client 170.

Before continuing with the detailed description of the figures, a brief discussion of backups is appropriate. In order to improve reliability and facilitate disaster recovery in the event of a failure of a filer, its associated disks or some portion of the storage infrastructure, it is common to "mirror" or replicate some or all of the underlying data and/or the file system that organizes the data. In one example, a mirror is established and stored at a remote site, making it more likely that recovery is possible in the event of a true disaster that may physically damage the main storage location or its infrastructure (e.g. a flood, power outage, act of war, etc.). The mirror is updated at regular intervals, typically set by an administrator, in an effort to catch the most recent changes to the file system.

One common form of update involves the use of a "snapshot" process in which the active file system at the storage site, consisting of inodes and blocks, is captured and the "snapshot" is transmitted as a whole, over a network (such as the well-known Internet) to the remote storage site. Generally, a snapshot is an image (typically read-only) of a file system at a point in time, which is stored on the same primary storage device as is the active file system and is accessible by users of the active file system. By "active file system" it is meant the file system to which current input/output operations are being directed. The primary storage device, e.g., a set of disks, stores the active file system, while a secondary storage, e.g., a tape drive, may be utilized to store backups of the active file system. Once the snapshot is taken (i.e., the image captured), the active file system is reestablished, leaving the snapshotted version in place for possible disaster recovery. Each time a snapshot is taken, the old active file system becomes the new snapshot, and the new active file system carries on, recording any new changes. A set number of snapshots may be retained depending upon various time-based and other criteria.

"Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other unique identifier that distinguishes it from other PCPIs taken at other points in time. A PCPI can also include other information (metadata) about the active file system at the particular point in time for which the image is taken. The terms "PCPI" and "snapshot" shall be used interchangeably through out this patent without derogation of Network Appliance's trademark rights.

A snapshotting process is described in further detail in U.S. patent application Ser. No. 09/932,578, entitled INSTANT SNAPSHOT by Blake Lewis et al., which is hereby incorporated by reference as though fully set forth herein. In addition, the native Snapshot™ capabilities of the WAFL file system are further described in *TR3002 File System Design for an NFS File Server Appliance* by David Hitz et al., published by Network Appliance, Inc., and in commonly owned U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., which are hereby incorporated by reference.

With renewed reference to FIG. 2, overlying the file system layer 250 is the user interface 285 for the administrator. This can be accessed via the various protocols (CIFS, NFS, etc.) described above.

Also, overlying the file system layer 250 is a specialized asynchronous volume and sub-volume (or "qtree") snapshot mirroring (or replication) application 290. This application is responsible for the generation of the mirrors at a remote destination storage volume based upon changes in snapshots at the source. The snapshot mirroring application 290 operates outside of the storage access request path 270, as shown by the direct links 292 and 294 to the TCP/IP layers 215, 210 and the file system snapshot mechanism (280). This application enables "asynchronous" mirroring of changes in the respective sub-volume. That is mirroring is written incrementally (and not in real-time with respect to changes occurring on the source sub-volume) to a destination store that can be remote and linked by a network connection. A discussion of asynchronous mirroring at a volume and sub-volume (or q-tree) level is found in U.S. patent application Ser. No. 10/100,967, entitled SYSTEM AND METHOD FORT DETERMINING CHANGES IN TWO SNAPSHOTS AND FOR TRANSMITTING CHANGES TO A DESTINATION SNAPSHOT by Michael L. Federwisch, et al., which is hereby incorporated by reference.

Likewise a synchronous volume snapshot mirroring application 298 acting on the RAID layer is provided. This application provides synchronous (real-time) mirroring to a mirror store in response to a mirror command initiated by an administrator. This mirroring creates a point-in-time image of the source that copies it as it existed at the time the mirror command is acted upon. Approaches to volume-based remote mirroring of snapshots are described in detail in commonly owned U.S. patent application Ser. No. 09/127, 497, entitled FILE SYSTEM IMAGE TRANSFER by Steven Kleiman, et al. and U.S. patent application Ser. No. 09/426,409, entitled FILE SYSTEM IMAGE TRANSFER BETWEEN DISSIMILAR FILE SYSTEMS by Steven Kleiman, et al., both of which patents are expressly incorporated herein by reference.

Notably, the storage operating system includes a WORM utility 299 that resides generally in the file system layer 250. As will be described in detail below, this WORM utility is responsible for establishing specialized worm volumes 275 in the file system that are differentiated from conventional file system volumes 276. These volumes are carried respectively into the RAID layer as corresponding, differentiated WORM and non-WORM RAID volumes 277 and 278, respectively. Moreover, this utility is responsible for establish WORM files or like "WORM data containers" (e.g. clocks, etc.) within a WORM volume that are non-rewritable and non-erasable/deletable. By action of the utility 299, the respective directory pathways (or other identifying logical organization) of any WORM files/data containers are, likewise locked against deletion so long as a WORM file resides in the path/tree.

Before proceeding with a more detailed description of the illustrative embodiment, the following definitions are provided. The term "data container," as noted above, shall refer generally to a file, LUN (logical unit number), or any other separately or individually addressable data structure. The term "volume" shall refer to a logical group of data containers. The term "directory" shall refer to an organizational structure that facilities access of a given data container through traversal of trees or another logical indexing structure. Likewise the term "pathway" or "path" shall refer to the route taken by the storage operating system through the directory structure in addressing the data container. In addition, it is expressly contemplated that the teachings of this invention can be applies to a variety of storage environments and data types including, but not limited to, file data, database data, block-level data, etc.

C. WORM Volume Creation

Figure 3:
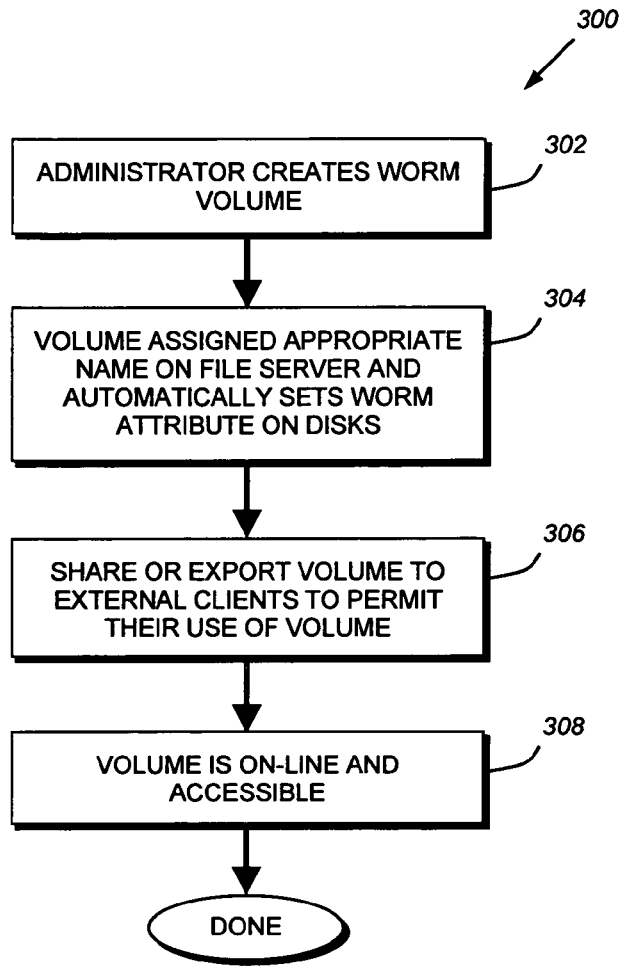
FIG. 3 is a flow diagram of a WORM volume creation procedure according to an illustrative embodiment of the present invention.

With reference to the flowchart in FIG. 3, a generalized procedure 300 for creating a WORM volume and the results of its creation is described. This procedure is implemented typically by the administrator using the administrative console and interface to input the appropriate volume create command. The file system is modified to recognize a new semantic relative to the conventional (pre-WORM) volume create command that designates a WORM volume. In step 302 the administrator initially creates the WORM volume having some general parameters such as for size in terms of number of disks. In one embodiment this is accomplished by typing in the following exemplary command including the volume name "volname" and the "-w", the number of disks:

vol create<volname>-w <number of disks>.

Next, in step 304, the volume is assigned the requested name (volname) on the file server. As such, it is identified as /vol/volname. The disks that are associated with the volume are marked with a WORM attribute on their RAID labels in persistent storage so that they are identified as WORM volumes. This may require a modification of the conventional RAID layer structure to account for this added label. While WORM is enforced primarily at the file system layer, this tag serves both to identify the assigned disk as a WORM store. Here, the WORM designation is stored in non-volatile memory in the persistent label of a WORM disk. The label contains identification information regarding the disk that permits the storage operating system to map the disk to particular volumes, and is stored in a standardized location on the disks (for example, the beginning). In this manner, the WORM designation is maintained on the disk itself containing the WORM file. Additionally, the WORM designation can be stored in NVRAM or other persistent/battery-backup memory structures and to prevent the inadvertent or deliberate destruction of the volume as discussed further below. Note that step 304 does not require user interaction as the volume name is assigned as part of the creation process for WORM volumes. This can be handled internally by the system.

In step 306, the volume is then exported (for NFS clients) or shared (for CIFS clients) or otherwise made available for use by outside clients. The export/share step is a conventional process that gives appropriate use permissions to clients. In the example of an NFS client the simplified syntax of a suitable command is:

exporfs[-o options] /vol/volname

Likewise in the example of a CIFS client, the syntax is:

cifs shares-add <sharename>/vol/volume

Exports and shares may include appropriate access controls and privileges to clients so that only certain users may access the volume. Permissions are also entered.

These generally control what can be done on and to the volume (aside from WORM) functionality. For example it is possible to create a read-only volume, but this would limit future writing to the volume. For example, in contradistinction to a Microsoft Office environment in which in which a user can revoke or release read-only status, the WORM status is not revocable under any circumstance by a user, administrator or other so as to maintain the integrity of the WORM data.

Finally, in step 308, the WORM volume is now on-line and accessible by clients. The WORM functionality is in operation and in force, and the restrictions it imposes are present. In one embodiment these restrictions can include:

1. WORM disables the volume destroy command—no WORM volume destruction permitted so that a WORM volume is immutable.

2. WORM disables conventional restoration of WORM volume or parts thereof from a snapshot—prevents improper reconstruction from an earlier point-in-time image that obliterates later modifications to files and WORM files committed after the point-in-time.

3. Permissions (Set Attributes command "SETATTR" in NFS) (Set File Information "TRANS2_SET_FILE_INFORMATION" command in CIFS) require that any file (or data container) within the volume be a WORM file if it is set to "read-only" from an initial not-read-only—state the file system layer distills all permissions from their respective protocols to cause WORM state to be assigned to files which undergo this not-read-only to read-only transition.

4. Any WORM file modifications (e.g. write, rename, delete, file attribute change, etc.) within the volume that modify the state of the file, including attempted modification of date stamps, read-only status, etc. are restricted. If file access/modification is requested the file system first checks the WORM state of the volume and then the target file's individual WORM state (described below) is checked before modification is permitted. If the file is WORM, then the modification is restricted, and the file server returns an appropriate file error message such as "read-only" or "access-denied" denying the modification request.

More specifically, in an exemplary CIFS environment, conventional file attributes can include: the hidden file flag, read-only flag, archive flag (set before backup performed but after writing to file), creation timestamp, modification timestamp, access timestamp, access control lists (ACLs) and NT streams. These attributes are typically locked against modification where such modification may allow improper changes to a file. Note that the modification timestamp becomes set to the creation timestamp once the file is fully committed to WORM storage.

In the NFS example, conventional file attributes that are locked can include access control and other permissions related to the file owner, group, etc. NFSv4 has many similar attributes to be locked to those in CIFS described above.

5. Directory renaming is not permitted in a WORM volume in one embodiment. This prevents the directory from being altered to potentially misplace a WORM file. It is contemplated, in an alternate embodiment, that directory renaming is allowed as long as the renaming does not misplace any WORM files, however, in many instances, the basic rule of preventing directory renaming in a WORM volume reduces overhead and increases performance by eliminating the need to check for the displacement of any WORM files in a directory tree whenever a directory renaming command is entered.

Figure 4:
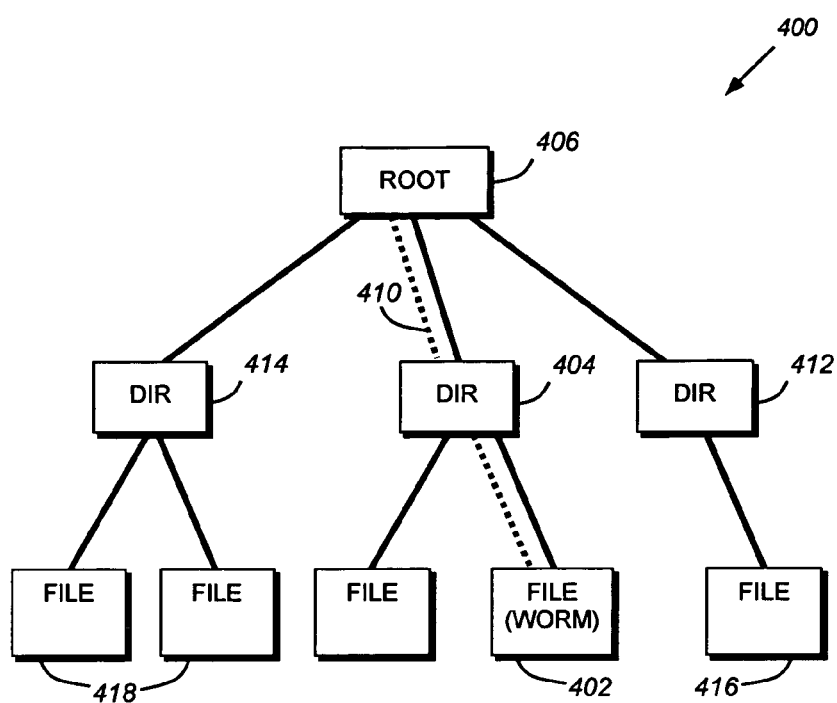
FIG. 4 is a schematic diagram of a directory tree showing an exemplary WORM file pathway.

6. Directory deletion is not permitted where a WORM file is present. As shown generally in FIG. 4, the committing of a WORM file 402 to a directory tree 400 of a WORM volume makes it immutable and not subject to deletion or modification. Accordingly, its directory 404 and root (as well as any subdirectories along its path 410) cannot be deleted in accordance with conventional file system semantics. In other words, if at least one undeleted file remains, the overlying directories cannot be deleted according to accepted file system rules in virtually all file systems. Where such a file system does not explicitly call for this rule, the file system should be overtly modified to restrict WORM file-path deletions. Other non-WORM directories 412 and 414 and their respective files 416 and 418 may be deleted normally according to this embodiment.

D. Worm File Creation

Once a WORM volume is created by the administrator as described above, it is available for use by permitted clients. The WORM volume allows all conventional volume operations on non-WORM files and directories (e.g. create directories and files, write to files and delete directories and files) subject to the general restrictions above. In addition, the volume allows the one-time writing of WORM files and the reading or copying of WORM files. WORM files are specialized files (or data containers) within the overall WORM volume. In other words, not all files within a volume are necessarily WORM files. WORM files are created by client and file server applications where needed to store or archive information that must remain immutable. One such application may be an e-mail archive program that gathers desired e-mail records on a continuous or periodic basis and stores the records in an archive file.

In the example of a client running the well-known Windows® operating system (available from Microsoft Corporation of Redmond, Wash.), the procedure 500 for creation of a file and its commitment to WORM is shown in FIG. 5. First, in step 502 the client adds a network share for the WORM volume into which a WORM file is to be stored. In one example, this volume can be named "drive W." This drive then appears in the list of shared drives shown to the client. Next, in step 504 the file is saved to the WORM drive W using standard Windows commands. Finally, in step 506 the client calls up the "file properties" dialog and sets the read-only attribute for the WORM file on drive W. The file server's file system recognizes the transition of the file from not-read-only to read-only state and thenceforth designates the file as WORM and all the above restrictions or modification, changes in attribute, etc. are enforced. Significantly, any subsequent attempt by the client to modify the read-only state of the file is denied, and a permission denied message is returned to the client from the file server. In this manner, the final step 506 is termed the "commit" of the file to WORM state. For any protocol, the commit step is needed to imbue the file with WORM characteristics.

It should be noted that, in the illustrative embodiment, the commit process is dependent not simply upon the storage of a read-only file in a WORM volume, but rather the transition of the file within the WORM volume from a not-read-only state to a read-only state. Copy utilities and other file-creating applications that do not transition the file to read-only from a not-read-only state may not render a file as WORM.

While the commit process according to an illustrative embodiment involves the transition of a file attribute from a not-read-only to a read-only state, it is contemplated that other transitions of other conventional attributes (such as the renaming of a file to a WORM file-type) or setting of other specialized attributes or metadata can be used to trigger commit. Alternatively, the storage of the data or file (or movement thereof) into a WORM-designated portion or structure of storage (such as a WORM directory) could act as the trigger for commit.

In the example of a client running the well-known Unix® operating system, connected to the file server via NFS, the procedure 600 in FIG. 6 outlines the associated WORM file creation and commitment steps. First, in step 602 the WORM volume is mounted using conventional volume-mounting procedures. The exemplary command "mount filer:/vol/volname/worm" can be used. Give an exemplary not-read-only file, file.txt to be WORM-stored, the file is then copied (step 604), and the typical command line shell command would be:

cp file.txt/worm.

This copies the file to the volume as a designated worm file. Once the file is copied, it must then be committed to WORM in accordance with step 606. This is accomplished by removing all write permissions from all owners, groups and users, thereby transitioning the file from not-read-only to read-only state, and hence, WORM. The shell exemplary command for removal of permissions would be:

chmod-w/wormlfile.txt.

In a conventional DOS shell, the commit is simply the expression:

ATTRIB+R<filename>.

Each of the above command line expressions are specifically used in interactive sessions at the client. In other words, the client user physically enters the command and awaits the appropriate response from the file server. These create and commit procedures can be carried out internally within a program application as well. Each well-known operating system (Windows, Unix, etc.) supports application-based commit and attribute-change functions. The following function calls would be incorporated in application programs to implement WORM. Note that other modifications to applications to recognize the WORM existence (such as changes to graphical user interfaces for the application) may also be required to fully implement WORM functionality. Also, it is contemplated that WORM volumes are used only with applications that recognize and can employ a WORM volume's special properties and modified semantics. By way of example, the following is a Windows-based C++ (Win32) application program interface function call for commit to WORM (e.g. to set "read-only"):

SetFileAttributes(<file>, FILE_ATTRIBUTE_REA-
DONLY)

Likewise, for Unix-based systems, the application function call would be:

fchmod (<file>, 0444)

As should be clear from the above description, the creation of WORM volumes as well as the storage of WORM files (data containers) according to this embodiment requires minimal alteration to the open protocols (CIFS, NFS, etc.), and similarly, minimal alteration of specific applications using the WORM functionality. This is because the majority of new functionality is contained within the file system layer, and that file system layer is adapted to recognize simple modifications to volume-create commands and preexisting file attribute transitions (i.e. not-read-only to read-only) to implement WORM within the file system layer. In addition, since the file system layer is largely independent the various open protocols and passes the information on to the storage layer with uniform WORM characteristics, minimal modifications must be made at the storage layer or other layers within the storage operating system.

It is contemplated that an automatic commit function can be incorporated into the open protocols according to an alternate embodiment. In particular, due to the stateful nature of CIFS, a procedure can be implemented that causes a commit to WORM upon closing of a created WORM file. That is, the protocol recognizes the worm create dialog and proceeds with a commit (e.g. not-read-only to read-only attribute change) when the file is closed. This is more challenging in a stateless protocol such as NFS. However, NFSv4 supports a number of stateful operations and may provide a ready platform for automatic commit like CIFS. Other protocols may also be provided with automatic commit upon file closure.

In another alternate embodiment, it is contemplated that further modifications can be made to the open protocols to accommodate a WORM-directory. In one implementation, only WORM files may have access to the worm directory. To this end, a ".worm" file extension is provided so as to allow a user to view all files having a worm commit. An advantage to committing an entire directory atomically, in one transaction, is that it limits problems resulting from a partial commit of files that may be followed by a crash or other interruption before the remaining files are committed. There may arise inconsistencies as result of the partial commit when the later files are finally committed.

It is also contemplated that WORM volume activity, such as volume creation and volume destruction (if permitted), WORM file writes, etc. can be detected and logged to the administrator via the Simple Network Management Protocol (SNMP). The filer can include a log or maintenance file and SNMP can use traps to detect this activity. In this manner a log of all WORM activity can be maintained, further facilitating data integrity and maintenance and audit of data access, e.g., for law enforcement or internal security purposes.

E. Mirroring and Replication Considerations

Figure 7:
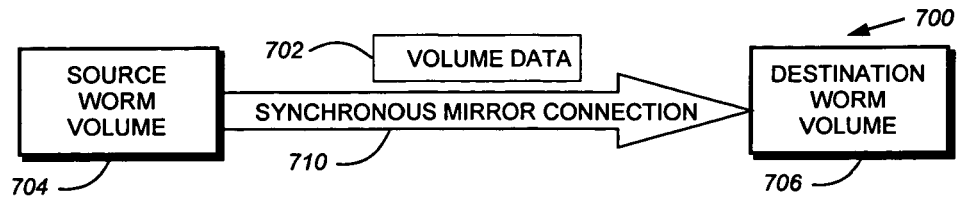
FIG. 7 is a schematic diagram of a synchronous mirroring procedure according to an illustrative embodiment of the present invention.

As described briefly above, certain snapshot restoration functions may need to be disabled. By way of background, FIG. 7 details a synchronous mirroring procedure 700 in which WORM volume data 702 is transmitted to a destination volume 706 in real-time as it is created and stored on the source WORM volume 704. The transmission generally occurs over a high-speed link 710 using a transport protocol (Fibre Channel, iSCSI, etc.) capable of supporting a high-speed, real-time data transfer from source to destination. In essence, the mirror is another disk array, being filled at the same time as the source. Hence, whatever enters the source volume, also enters the mirror destination volume. Since the majority of the mirror function is handled at the storage (RAID) layer, little intervention from the higher level file system on the source is needed.

Before the destination volume is used, it is first created on the destination storage system. Creation of the destination volume is accomplished by act of an administrator using an appropriate volume create command. Typically, the destination volume is created as a WORM volume, requiring that the backup storage system, upon which the destination volume resides, have a file system that includes the WORM functionality. By using a WORM mirror volume, the integrity of the stored data is further protected and it complies with the general requirements for secure backup storage. It is possible and may sometimes be desirable to establish a non-WORM destination volume, but such a volume may violate rules for secure backup store.

Because the destination volume is a WORM volume, any interruption in the mirroring process may be irreparable. In the event of an interruption, the system may be required to reinitialize the mirror including transferring all stored records, i.e., a level zero transfer to a newly created destination volume.

As with other mirror processes to be described herein, the WORM nature of the source may impose limits on the reconstruction of a source from a destination (e.g. a restore process) in the event of a disaster. Since WORM files in the source WORM volume are, by definition, non-rewritable, the preferred procedure to repair the source volume is to replace it with the mirrored destination volume. Partial reconstruction of the source using the destination may be prohibited. In general, however, this is a minimal disadvantage in a synchronous mirroring approach since the destination is presumed to always contain the most up-to-date version of the source and can be easily swapped, in its entirety, for the source if necessary.

Figure 8:
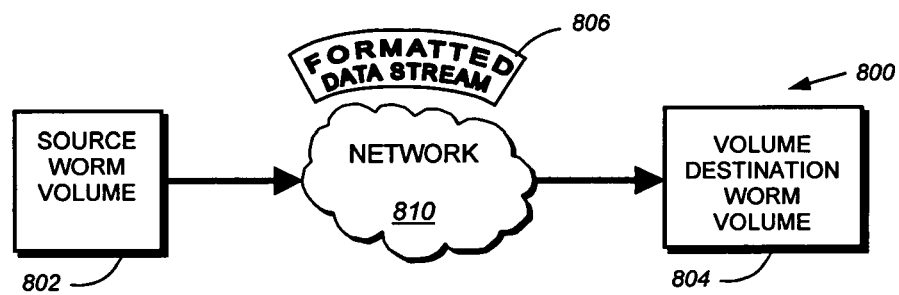
FIG. 8 is a schematic diagram of an asynchronous mirroring procedure according to an illustrative embodiment of the present invention.

FIG. 8 shows a simplified diagram of an asynchronous mirroring procedure 800. This approach is described in detail in the above-incorporated U.S. patent application Ser. No. 10/100,967, entitled SYSTEM AND METHOD FORT DETERMINING CHANGES IN TWO SNAPSHOTS AND FOR TRANSMITTING CHANGES TO A DESTINATION SNAPSHOT by Michael L. Federwisch, et al., and should be referenced in conjunction with the following description.

The file system of the source volume 802 is adapted to generate time-separated point-in-time images or "snapshots" (280 in FIG. 2) of the source volume data structure or the data structures of certain sub-volumes (for example q-trees). Note that one such sub-volume can be a worm (a ".worm" extension, for example) directory structure as described above. In accordance with the above-incorporated reference, the snapshots are scanned by the asynchronous snapshot mirroring application to detect changes in files based upon noted differences between snapshots taken at different times. After establishment of an appropriate WORM volume at a destination 804, the changes are transmitted in a formatted data stream 806 over a conventional (typically lower-speed) network connection 810—that may include the well-known Internet. Because of the lower-speed connection, the changes are not generally changes occurring in real-time, but are written to the destination "asynchronously" or in lazy write fashion at periodic intervals.

Figure 9:
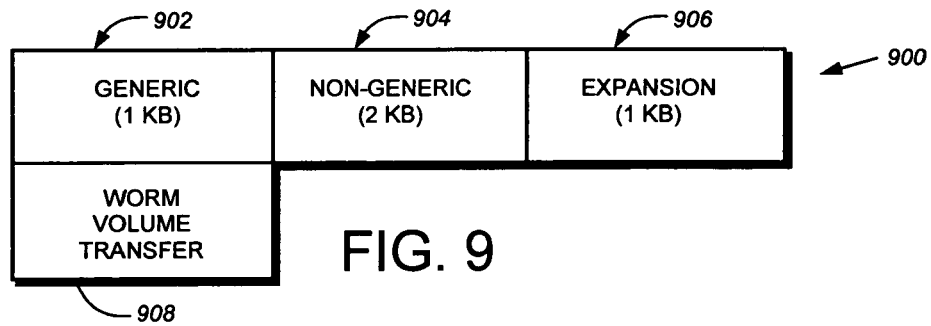
FIG. 9 is a schematic representation of a generic header for a data format used in the asynchronous mirroring procedure of FIG. 8.

In order to facilitate transfer of data from the source WORM volume 802 to the destination WORM volume in an asynchronous transfer, the data is formatted as a series of metadata (in the form of inodes in one embodiment) and associated file data. To make this data meaningful to the destination file system, it is formatted using recognizable headers that separate various portions of the data transfer (e.g. metadata versus file data) and that signal which type of data transfer is occurring. Certain headers are also provided that stand alone and include information such as deleted file lists. FIG. 9 details a simplified version of the header described in detail in the above-referenced Federwisch, et al. application. This header includes a generic part 902 of 1 KB, a non-generic part 904 of 2 KB and an expansion segment 906 of 1 KB. Added to the generic part 902 is a worm volume transfer flag 908 that signals the destination file system that WORM volume information is being transmitted in the data stream to follow. This flag is located in the "public" portion of the header so as to be recognized by open protocols.

Figure 10:
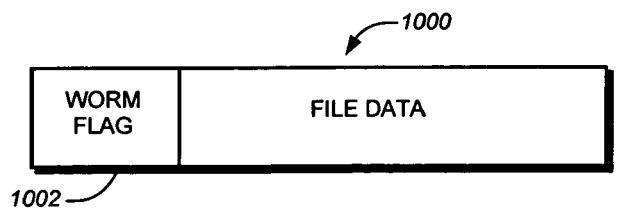
FIG. 10 is a schematic representation of a WORM flag for a data file transmitted in accordance with the asynchronous mirroring procedure of FIG. 9.

Similarly, as shown in FIG. 10, each data file 1000 in the stream contains a WORM flag bit 1002. This bit, in combination with the header information is used to reconstruct new inodes (metadata) in the destination WORM volume with an appropriate WORM state information about the file (or other data container) to which the inode/metadata points.

The destination file system's mirroring application is adapted to translated the encoded flags appropriately. More specific details regarding the procedure by which inodes are constructed in the destination volume are provided in the above-referenced application.

In a further embodiment, it is contemplated that security between a source and destination file server may be enhanced by employing conventional encryption and/or authentication techniques or other security-enhancing measures. In such an implementation it is contemplated that certain restoration functions otherwise considered undesirable, may be employed with safety.

The foregoing has been a detailed description of illustrative embodiments of the invention. Various modifications and additions can be made without departing from the spirit and scope of the invention. Likewise, the internal architecture of the servers or their respective storage arrays, clients, as well as their network connectivity and protocols, are all highly variable. The operating systems used on various source and destination servers can differ. In addition, it is expressly contemplated that any of the operations and procedures described herein can be implemented using hardware, software comprising a computer-readable medium having program instructions executing on a computer, or a combination of hardware and software.

What is claimed is:

1. A method for implementing write-once-read-many (WORM) storage system having a file system comprising the steps of:
    issuing a WORM volume create command to create a designated WORM volume among a set of disks;
    creating a WORM file and saving the WORM file to the designated WORM volume;
    transmitting and committing the WORM file to the designated WORM volume by transitioning a WORM file attribute to transition the WORM file from a not-read-only state to read-only state, wherein said transmitting comprises transmitting changes between point-in-time images that include the WORM file using a data format over a network;
    storing a WORM state of the WORM file with the WORM file attribute and metadata for the WORM file, where the file system recognizes the WORM state including a read-only file attribute as designating the WORM file in the designated WORM volume;
    using the WORM state to recognize the WORM file on the WORM designated volume; and
    preventing renaming of directory paths that include the WORM file in the designated WORM volume.

2. The method as set forth in claim 1 wherein the step of committing is performed by an application on a client interconnected to the file server.

3. The method as set forth in claim 1 wherein the step of issuing is performed by an administrator before the step of creating.

4. The method as set forth in claim 1 further comprising creating a WORM volume at a mirror destination and transmitting and committing the created WORM file to the destination WORM volume.

5. A computer-readable medium for implementing write-once-read-many (WORM) storage system having a file system that includes program instructions for performing the steps of:
    issuing a WORM volume create command to create a designated WORM volume among a set of disks;
    creating a WORM file and saving the WORM file to the WORM volume;
    transmitting and committing the WORM file to the designated WORM volume by transitioning a WORM file attributeto transition the WORM file from a not-read-only state to read-only state, wherein said transmitting comprises transmitting changes between point-in-time images that include the WORM file using a data format over a network;
    storing a WORM state of the WORM file with the WORM file attribute and metadata for the WORM file, where the file system recognizes the WORM state including a read-only file attribute as designating the WORM file in the designated WORM volume;
    using the WORM state to recognize the WORM file on the designated WORM volume; and
    preventing renaming of directory paths that include the WORM file in the designated WORM volume.

6. The computer-readable medium as set forth in claim 5 wherein the step of committing is performed by an application on a client interconnected to the file server.

7. The computer-readable medium as set forth in claim 5 wherein the step of issuing is performed by an administrator before the step of creating.

8. The computer-readable medium as set forth in claim 5 further comprising creating a WORM volume at a mirror destination and transmitting and committing the created WORM file to the destination WORM volume.

9. A method for implementing write-once-read-many (WORM) storage system comprising the steps of:
    issuing a WORM volume create command to create a designated WORM volume among a set of disks, the WORM volume storing data containers based upon an organizational structure;
    creating a WORM data container and saving the WORM data container to the designated WORM volume;
    transmitting and committing the WORM data container to the designated WORM volume by transitioning a data container attribute to transition the WORM data container from a not-read-only state to read-only, wherein said transmitting comprises transmitting changes between point-in-time images that include the WORM data container using a data format over a network;
    storing a WORM state of the WORM data container with the data container attribute and metadata for the WORM data container, where the storage system recognizes the WORM state including a read-only data container attribute as designating the WORM data container in the designated WORM volume;
    using the WORM state to recognize the WORM data container on the designated WORM volume; and
    preventing changing identification of parts of the organizational structure that include the WORM data container in the designated WORM volume.

10. The method as set forth in claim 9 wherein the step of committing is performed by an application on a client in communication with the storage system.

11. The method as set forth in claim 10 wherein the step of issuing is performed by an administrator before the step of creating.

12. The method as set forth in claim 9 further comprising creating a WORM volume at a mirror destination and transmitting and committing the created WORM data container to the destination WORM volume.

13. The method as set forth in claim 9 wherein the data container comprises a file, the organizational structure comprises a directory tree structure and the data container attribute comprises a file attribute.

14. The method as set forth in claim 9 further comprising, in response to creating the designated WORM volume, disabling reconstruction of the designated WORM volume, to an earlier point in time using a point-in-time image of the designated WORM volume or a portion thereof.

15. The method as set forth in claim 14 wherein the point-in-time image comprises either of a mirror or a snapshot of the designated WORM Volume or the portion thereof.

* * * * *